(12) United States Patent
Aoki et al.

(10) Patent No.: US 9,932,000 B2
(45) Date of Patent: Apr. 3, 2018

(54) INFORMATION NOTIFICATION APPARATUS AND INFORMATION NOTIFICATION METHOD

(71) Applicant: FUJITSU LIMITED, Kawasaki-shi, Kanagawa (JP)

(72) Inventors: Yasuhiro Aoki, Kawasaki (JP); Masami Mizutani, Mountain View, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/384,657

(22) Filed: Dec. 20, 2016

(65) Prior Publication Data

US 2017/0190306 A1 Jul. 6, 2017

(30) Foreign Application Priority Data

Jan. 6, 2016 (JP) .................................. 2016-001349

(51) Int. Cl.
*G08B 23/00* (2006.01)
*B60R 16/023* (2006.01)
*G06K 9/00* (2006.01)
*H04N 7/18* (2006.01)

(52) U.S. Cl.
CPC ...... *B60R 16/0231* (2013.01); *G06K 9/00604* (2013.01); *G06K 9/00617* (2013.01); *G06K 9/00845* (2013.01); *H04N 7/183* (2013.01)

(58) Field of Classification Search
CPC ............ B60R 16/0231; G06K 9/00604; G06K 9/00617; G06K 9/00845; H04N 7/183
USPC .......................................................... 340/576
See application file for complete search history.

(56) References Cited

U.S. PATENT DOCUMENTS

| | | | | |
|---|---|---|---|---|
| 9,586,591 | B1 * | 3/2017 | Fields .................... | B60W 40/09 |
| 2002/0140562 | A1 * | 10/2002 | Gutta ..................... | G08B 21/06 340/576 |
| 2007/0089054 | A1 * | 4/2007 | Morimoto ............... | B60Q 9/00 715/700 |
| 2010/0073152 | A1 * | 3/2010 | Nagamine ............. | B60W 50/08 340/425.5 |
| 2011/0141010 | A1 * | 6/2011 | Sakata ................. | G06K 9/0061 345/156 |
| 2014/0125474 | A1 * | 5/2014 | Gunaratne ............. | G08G 1/163 340/439 |

(Continued)

FOREIGN PATENT DOCUMENTS

| | | |
|---|---|---|
| JP | 10-244892 | 9/1998 |
| JP | 2000-211543 | 8/2000 |

(Continued)

*Primary Examiner* — Kerri McNally
*Assistant Examiner* — Thang Tran
(74) *Attorney, Agent, or Firm* — Fujitsu Patent Center

(57) ABSTRACT

An information notification apparatus includes a camera; a memory; and a processor coupled to the memory and configured to perform line-of-sight detection on an image captured by the camera, calculate a forward gaze degree of a gaze directed to a predetermined area in accordance with a line-of-sight direction obtained in line-of-sight detection; execute a notification to an outside in a first information if the forward gaze degree is lower than a first threshold; and execute the notification in a second information which information is less than the first information if the forward gaze degree is higher than or equal to the first threshold.

9 Claims, 8 Drawing Sheets

(56) References Cited

U.S. PATENT DOCUMENTS

| | | | |
|---|---|---|---|
| 2014/0129092 A1 | 5/2014 | Mori et al. | |
| 2014/0168399 A1* | 6/2014 | Plummer | B60Q 9/00 348/78 |
| 2014/0272810 A1* | 9/2014 | Fields | G09B 19/14 434/65 |
| 2014/0362202 A1* | 12/2014 | Tschirhart | G06K 9/00248 348/78 |
| 2015/0006278 A1* | 1/2015 | Di Censo | G06K 9/00845 705/14.43 |
| 2015/0077313 A1* | 3/2015 | Gao | A61B 3/113 345/8 |
| 2015/0154461 A1* | 6/2015 | Kitaura | G06K 9/00845 348/148 |
| 2015/0160020 A1* | 6/2015 | van Hemert | A61B 5/18 701/532 |
| 2015/0310287 A1* | 10/2015 | Tseng | B60K 35/00 382/104 |
| 2015/0332091 A1* | 11/2015 | Kim | G06T 7/337 382/103 |
| 2016/0027276 A1* | 1/2016 | Freeck | B60R 16/037 340/576 |
| 2016/0054565 A1* | 2/2016 | Izumihara | G09G 5/00 345/8 |
| 2016/0055764 A1* | 2/2016 | Kujala | B60W 50/14 434/66 |
| 2016/0121794 A1* | 5/2016 | Iguchi | G08G 1/166 345/7 |
| 2016/0176372 A1* | 6/2016 | Kim | E05F 15/73 701/49 |
| 2016/0272215 A1* | 9/2016 | Laine | B60W 50/14 |
| 2017/0115124 A1* | 4/2017 | Mullen | G01C 21/3415 |

FOREIGN PATENT DOCUMENTS

| | | |
|---|---|---|
| JP | 2004-070795 | 3/2004 |
| JP | 2008-241309 | 10/2008 |
| JP | 2010-237954 | 10/2010 |
| JP | 2010-282592 | 12/2010 |
| JP | 2014-091440 | 5/2014 |

* cited by examiner

INFORMATION NOTIFICATION APPARATUS AND INFORMATION NOTIFICATION METHOD

CROSS-REFERENCE TO RELATED APPLICATION

This application is based upon and claims the benefit of priority of the prior Japanese Patent Application No. 2016-001349, filed on Jan. 6, 2016, the entire contents of which are incorporated herein by reference.

FIELD

The embodiments discussed herein are related to an information notification apparatus and an information notification method.

BACKGROUND

As the use of information and communication technology (ICT) has evolved or automobiles have become smarter, various vehicle-mounted apparatuses are being made high-functional and multifunctional. In this situation, when a message is received in a vehicle by, for example, a smartphone or a vehicle-mounted apparatus connected to the smartphone through a social networking service (SNS) or another service, the message may be displayed in the vehicle.

If a message is displayed in a situation in which the driving load of the driver, which is a so-called workload, is high, the driver's attention may be diverted to the displayed message and may not concentrate on the driving. As a result, so-called distraction may occur, in which case the driving may be adversely affected.

An information display system described below is disposed as an example of countermeasures against this distraction. In this information display system, information acquired from engine control units (ECUs) intended for vehicle control, a navigation ECU, or the like through an in-vehicle local area network (LAN) is used to execute load deciding processing by which whether the driving load is large or small is decided. For example, if the driver is backing up the vehicle, is turning a corner, is turning to the right or left, is changing the lane, or is accelerating or decelerating the vehicle, the driving load is decided to be large. Alternatively, if the vehicle is traveling on a narrow road, in a school zone, around a curve, is passing through a traffic intersection, a confluence, or a railroad crossing, does not keep a sufficient interval between the vehicle and the preceding vehicle, or is traveling in a congested state or at low visibility, the driving load is also decided to be large.

As an example of technology to measure the driver's load, a calling timing control apparatus is also proposed. This calling timing control apparatus controls a timing at which to originate a call to the driver's telephone or the like by using two workload measurement methods described below.

For example, in one workload measurement method, a quantification model, which is used to obtain a workload from data acquired from a line-of-sight sensor and a vehicle sensor, is created in advance. A workload is calculated by applying the data acquired from the line-of-sight sensor and vehicle sensor to the quantification model. This quantification model is created by using a statistical method such as in linear multi-regression analysis, main component analysis, or factor analysis to obtain, in various situations (such as at traffic intersections and during overtaking and the manipulation of an audio device), relationships between data detected by the line-of-sight sensor and vehicle sensor and the values of workloads in these situations. The values of workload in various situations are determined according to, for example, evaluation values to which the driver evaluates workloads that the driver feels in these situations. The values of workloads are not based on the driver's subjective evaluation, but are determined from the driver's biological signals (such as the heart rate, blood pressure, and breathing speed) that are acquired in various situations.

In the other workload measurement method, a workload conversion table, which is used to convert data acquired by a line-of-sight sensor, a vehicle sensor, and a road attribute analyzing unit, is referenced to convert data acquired by each sensor to workload data. The workload conversion table stores workload data corresponding to driver's manipulations, road attributes, manipulations of devices, acoustic content, and line-of-sight motions. Related techniques are disclosed in, for example, Japanese Laid-open Patent Publication No. 2014-91440, Japanese Laid-open Patent Publication No. 2010-282592, Japanese Laid-open Patent Publication No. 2004-70795, Japanese Laid-open Patent Publication No. 2008-241309, Japanese Laid-open Patent Publication No. 10-244892, and Japanese Laid-open Patent Publication No. 2010-237954.

SUMMARY

According to an aspect of the invention, an information notification apparatus includes a camera configured to capture an image of a driver of a vehicle, a memory, and a processor coupled to the memory and configured to perform line-of-sight detection based on the image captured by the camera, calculate a forward gaze degree of a gaze of the driver in accordance with a line-of-sight direction obtained in the line-of-sight detection, the forward gaze degree indicates whether the gaze of the driver is within a predetermined area of a direction in which the vehicle is traveling, provide a notification to the driver in a first information when the forward gaze degree is lower than a first threshold, and provide the notification to the driver in a second information when the forward gaze degree is higher than or equal to the first threshold, the second information includes less than the first information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The technologies described above may not suppress the occurrence of distraction.

In the information display system described above, for example, whether the driving load is high in the scene is decided in load deciding processing. However, it is difficult to completely list scenes in advance in which the driving load is high, and it is thereby difficult to suppress the occurrence of distraction in a scene that is not listed in load deciding processing.

In the one workload measurement method used by the calling timing control apparatus described above, applicable scenes are limited because there are differences among individual drivers, which involves inference of a model for each driver. However, it is neither efficient nor versatile to collect a subjective evaluation value and biological signal data for each driver.

In the other workload measurement method used by the calling timing control apparatus described above, a workload conversion table is used to convert data acquired by each sensor to a workload. Workload conversion tables of this type include a workload conversion table that converts data of line-of-sight motions to workload data. As one aspect of the workload conversion table, a lower workload is set for the line-of-sight motion of looking straight ahead than for other line-of-sight motions. However, when the driver is looking ahead, the workload is not low in some cases. This is because there are scenes in which even if the driver is looking ahead, it is better for the driver to carefully look ahead, that is, the workload is high; an example of such a scene is when the preceding vehicle applies a brake. In addition, it is difficult to completely list scenes in advance in which the driving load is high, as described above, and it is thereby difficult to suppress the occurrence of distraction in a scene that is not listed in workload conversion table.

An object of the present disclosure is to provide an information notification apparatus, an information notification method, and an information notification program that can suppress the occurrence of distraction.

The information notification apparatus, information notification method, and information notification program in this application will be described with reference to the attached drawings. Embodiments described below do no restrict the disclosed technology. The embodiments may be appropriately combined within a range in which any contradiction does not occur in processing.

First Embodiment

Figure 1:
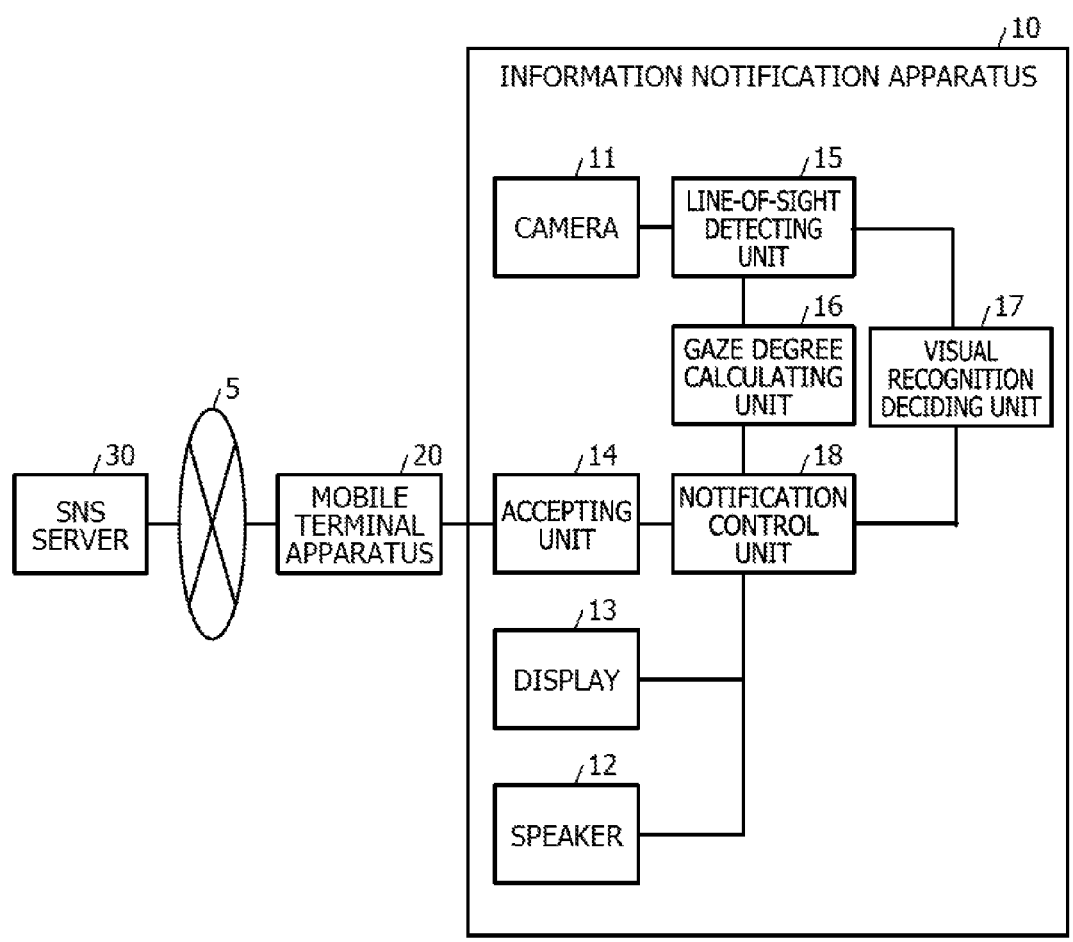
FIG. 1 is a block diagram illustrating the functional structure of an information notification apparatus in a first embodiment.

FIG. 1 is a block diagram illustrating the functional structure of an information notification apparatus 10 in a first embodiment. The information notification apparatus 10 in FIG. 1, which is a type of a vehicle-mounted apparatus, provides an information notification service that makes a notification of an incoming message received by a mobile terminal apparatus 20 through a communication service provided by, for example, a social networking service (SNS) server 30. As part of the information notification service, the information notification apparatus 10 implements notification control by which the occurrence of distraction is suppressed by a notification of an incoming message.

As illustrated in FIG. 1, the information notification apparatus 10 is connected to the mobile terminal apparatus 20. The connection between the information notification apparatus 10 and the mobile terminal apparatus 20 can be wired or wireless. If, for example, the connection between the information notification apparatus 10 and the mobile terminal apparatus 20 is wired, they are mutually connected through Universal Serial Bus (USB) or High-Definition Multimedia Interface (HDMI) (registered trademark). If the connection between the information notification apparatus 10 and the mobile terminal apparatus 20 is wireless, they are mutually connected through near field communication conforming to, for example, Bluetooth (BLE) (registered trademark) Low Energy or through a wireless local area network (LAN) conforming to, for example, Wi-Fi (registered trademark).

Furthermore, the mobile terminal apparatus 20 is connected to the SNS server 30 through a network 5. The Internet, a LAN, a virtual private network (VPN), and other types of communication networks can be used as the network 5, regardless of whether the connection is wired or wireless.

The SNS server 30 is a server apparatus operated by a service provider that provides social networking services.

As an embodiment, the SNS server 30 provides various types of services to the mobile terminal apparatus 20 of the client who receives social networking services, a communication application being installed in the mobile terminal apparatus 20. In the description below, a communication application may be abbreviated to as a communication appli. The SNS server 30 can provide, for example, a message exchange service in a chat form, a my-page function that releases a profile and avatar of the user itself, an address book function that registers friends and acquaintances with whom communication is performed on SNS, a visit history reference function by which a history of users who visited the my-page can be referenced, a diary function by which entries can be easily updated as in a blog, and other functions.

The mobile terminal apparatus 20 is a portable information processing apparatus.

As an embodiment, not only mobile communication terminals such as a smartphone, a mobile telephone, and a personal handyphone system (PHS) but also a tablet terminal, a slate terminal, and the like can be used as the mobile terminal apparatus 20. Communication applis, for use by clients, that are provided by various SNS service providers, for example, are installed in the mobile terminal apparatus 20. Under the condition that an environment in which communication applis operate is prepared in the mobile terminal apparatus 20 as described above, the mobile terminal apparatus 20 can transmit and receive messages to and from other users and other users who use SNS, through the message exchange service provided by the SNS server 30 as an example.

When the mobile terminal apparatus 20 described above is connected to the information notification apparatus 10, the information notification apparatus 10 can use part or all of the functions provided by the mobile terminal apparatus 20. For example, the information notification apparatus 10 may display, on a display 13, image data output from the mobile terminal apparatus 20 to the information notification apparatus 10, and can also output, from a speaker 12, voice data output from the mobile terminal apparatus 20 to the information notification apparatus 10, the display 13 and speaker 12 being included in the information notification apparatus 10. As part of this, the information notification apparatus 10 can make notifications of messages transmitted and received among SNS users through the above message exchange service, that is, outgoing information, incoming information, and the like that the mobile terminal apparatus 20 transmits and receives through the SNS server 30.

Although an example of notification control that suppresses the occurrence of distraction due to a notification of an incoming SNS message will be described below, it will be understood that this is done merely as an example; applications of the above notification control are not limited to this example. Specifically, there is no limitation on notifications if they are made to the driver and other occupants in the vehicle in which the information notification apparatus 10 is mounted; the above notification control can be applied to all these notifications. For example, the above notification control can also be applied to a notification of an incoming message in carrier communication rather than an incoming SNS message. The application range of the above notification control is not limited to notifications from the mobile terminal apparatus 20. For example, the above notification control can also be applied to notifications output from vehicle-mounted apparatuses that are not illustrated, such as, for example, a navigation apparatus and an engine control unit (ECU). In this case, the information notification apparatus 10 may not be connected to the mobile terminal apparatus 20 in some cases.

Structure of the Information Notification Apparatus 10

As illustrated in FIG. 1, the information notification apparatus 10 has a camera 11, a speaker 12, a display 13, an accepting unit 14, a line-of-sight detecting unit 15, a gaze degree calculating unit 16, a visual recognition deciding unit 17, and a notification control unit 18. Although solid lines are drawn in FIG. 1 to represent relationships between inputs and outputs of data, these solid lines are indicated in a minimal range for convenience of explanation. That is, inputs and outputs of data involved in each processing unit are not limited to the illustrated example, but inputs and outputs of data that are not illustrated, such as, for example, inputs and outputs of data between processing units and between a processing unit and an external apparatus, may be carried out.

The camera 11 is an imaging device in which a charge coupled device (CCD), a complementary metal oxide semiconductor (CMOS), or another imaging element is mounted.

As an embodiment, the camera 11 is used to capture an image used for line-of-sight detection. The camera 11 is disposed, for example, near the eyes of the face of an occupant eligible for line-of-sight detection, who is, for example, the driver, that is, at a position at which the camera 11 can photograph corneal reflexes and pupils with a predetermined number of pixels or more. In a situation in which the camera 11 is disposed as described above, the camera 11 controls a light source disposed near the camera 11 so that infrared rays illuminate the subject. The camera 11 then receives reflected light from the subject, converts the received reflected light to digital signals to form an image of the subject, and outputs the image to the line-of-sight detecting unit 15, which will be described later. At that time, if the eyeballs of the user are included in the subject, reflected light from the eyeballs is captured by the camera 11, so an image can be obtained in which the pupils of the eyeballs and corneal reflexes are brighter than other portions.

The speaker 12 is one type of voice output apparatus.

As an embodiment, the speaker 12 can be mounted as a speaker unit that includes one or a plurality of speakers. This speaker 12 can output voice data that is output from the mobile terminal apparatus 20 or another vehicle-mounted apparatus, the voice data being, for example, a sound effect such as a ring tone, music, or a guide voice. Here, a speaker has been taken as an example of a voice output apparatus, but a chime, a bell, and other voice output apparatuses can be substituted.

The display 13 is a display device that displays various types of information.

As an embodiment, a projector that produces a display by projection, a liquid crystal display or an organic electroluminescence (EL) device that produces a display by light emitting, and the like can be used as the display 13. Here, as an example, a case will be assumed in which a head-up display (HUD) is mounted as the display 13. The HUD produces a display by projecting an image on an arbitrary screen in the field of view ahead of the driver, such as, for example, the windshield of the vehicle in which the information notification apparatus 10 is mounted.

The accepting unit 14 is a processing unit that accepts various notifications.

As an embodiment, when the mobile terminal apparatus 20 receives a message from the SNS server 30, the accepting unit 14 can accept, from the mobile terminal apparatus 20, a notification of the incoming message received by the mobile terminal apparatus 20. Although a case in which a notification of an incoming SNS message is accepted has been described here merely as an example, this is not a limitation; a notification of an incoming message may be accepted from the mobile terminal apparatus 20 in carrier communication. In addition, the accepting unit 14 can accept various notifications from other vehicle-mounted apparatuses that are not illustrated, such as a navigation apparatus and an ECU.

The line-of-sight detecting unit 15 is a processing unit that executes line-of-sight detection to obtain a line-of-sight direction.

As an embodiment, each time an image is acquired from the camera 11, the line-of-sight detecting unit 15 applies an algorithm such as a corneal reflection method to the image to detect a line-of-sight direction that interconnects the central position of the pupil of the ellipse eyeball and the center of the curvature of the cornea. Although a case in which a corneal reflection method is used to perform line-of-sight detection has been described here merely as an example, another method can be used to perform line-of-sight detection. For example, if the windshield is segmented and the shapes of the eyes that view the segmented areas are stored in advance, then the line-of-sight detecting unit 15 can also obtain a line-of-sight direction by comparing the eye shapes detected from a subject image received from the camera 11 with a template. In addition, the line-of-sight detecting unit 15 may acquire a line-of-sight direction detected by a headset mounted on the driver.

The gaze degree calculating unit 16 is a processing unit that calculates the degree of gaze to a predetermined area. As an example, a case will be assumed here in which the degree of the forward gaze of the driver is calculated. The term forward described here indicates the forward direction of the lane on which the vehicle with the information notification apparatus 10 mounted is traveling.

As an embodiment, each time the line-of-sight detecting unit 15 executes line-of-sight detection, the gaze degree calculating unit 16 decides whether the line-of-sight direction obtained in the line-of-sight detection executed by the line-of-sight detecting unit 15 is included in a forward area defined ahead of the field of view of the driver. If, for example, a line-of-sight vector that interconnects the central position of the pupil of the eyeball and the center of the curvature of the cornea is obtained as a result of the line-of-sight detection, the gaze degree calculating unit 16 decides whether an angle formed by the line-of-sight vector and a predetermined forward linear vector is within a predetermined range. The term forward linear vector described here indicates a vector that has a direction in which the vehicle with the information notification apparatus 10 mounted travels forward and that is parallel to a horizontal plane.

If the angle formed by the line-of-sight vector and the forward linear vector is within the predetermined range, it can be decided that the driver visually recognizes the forward direction at a time when the image used by the line-of-sight detecting unit 15 in line-of-sight detection was captured by the camera 11. In this case, the gaze degree calculating unit 16 classifies the image used by the line-of-sight detecting unit 15 in line-of-sight detection as a forward visually recognized image. If the angle formed by the line-of-sight vector and the forward linear vector is not within the predetermined range, it can be decided that the driver does not visually recognize the forward direction at the time when the image used by the line-of-sight detecting unit 15 in line-of-sight detection was captured by the camera 11. In this case, the gaze degree calculating unit 16 does not classify the image used by the line-of-sight detecting unit 15 in line-of-sight detection as a forward visually recognized image.

Upon the completion of this classification, the gaze degree calculating unit 16 calculates the ratio of the number of frames of images classified as forward visually recognized images to the number of frames taken in a predetermined period in the past, that is, divides the number of frames classified as forward visually recognized images by the number of frames taken in the predetermined period. Thus, the gaze degree calculating unit 16 calculates a forward gaze degree. The predetermined period described here can be set by, for example, taking a time spent in one inattentive driving as a reference. For example, it is said that a time spent in one inattentive driving is 2 to 4 seconds, so the predetermined period can be set to 2 to 4 seconds. The time spent in inattentive driving varies with the travel environment and the vehicle speed. Therefore, if the travel environment, the vehicle speed, and other information can be acquired from the vehicle-mounted ECU or the like, the predetermined period can also be compensated by shortening or prolonging the time of 2 to 4 seconds. Each time a forward gaze degree is calculated as described above, the newest forward gaze degree is stored in a work area in an internal memory (not illustrated), updating the work area.

The visual recognition deciding unit 17 is a processing unit that decides whether a display on the display 13 has been visually recognized.

As an embodiment, after the notification control unit 18, which will be described later, displays an incoming message, each time the line-of-sight detecting unit 15 executes line-of-sight detection, the visual recognition deciding unit 17 monitors whether the incoming message has been visually recognized within a predetermined time, which is, for example, one minute, of the display of the incoming message. If, for example, a line-of-sight vector that interconnects the central position of the pupil of the eyeball and the center of the curvature of the cornea is obtained as a result of line-of-sight detection by the line-of-sight detecting unit 15, the visual recognition deciding unit 17 calculates the gaze point of the driver under the condition that the line-of-sight vector and a plane formed by the windshield of the vehicle with the information notification apparatus 10 mounted intersect. After that, the visual recognition deciding unit 17 decides whether the gaze point of the driver, which is calculated from the line-of-sight vector, is included in an incoming message display area projected on the windshield by the display 13. If the gaze point of the driver is not included in the incoming message display area within the predetermine time, it can be decided that the incoming message has not been visually recognized by the driver.

The notification control unit 18 is a processing unit that controls notifications by at least any one of display output on the display 13 and voice output from the speaker 12.

As an embodiment, if an incoming message is accepted by the accepting unit 14, the notification control unit 18 references the forward gaze degree stored in the internal memory by the gaze degree calculating unit 16. After that, the notification control unit 18 compares the forward gaze degree with at least any one of two thresholds denoted T1 and T2 and decides that the forward gaze degree is classified as which of three levels, low, middle, and high.

Specifically, the notification control unit 18 decides whether the forward gaze degree stored in the internal memory is lower than the threshold T1. As an example, the threshold T1 is set to a value according which it can be inferred to a certain extent that the probability is high that the driver has checked the right, left, back, and the like at a traffic intersection, a confluence, or another place. If the forward gaze degree is lower than the threshold T1, the notification control unit 18 classifies the forward gaze degree as the low level. When the forward gaze degree is classified as the low level in this way, the driver is under pressure of checking the circumference, so it can be inferred that the driving load, that is a so-called workload, is high. In this case, even if an incoming message has been accepted by the accepting unit 14, the notification control unit 18 puts the incoming message on hold without immediately displaying the incoming message on the display 13.

If the forward gaze degree is higher than or equal to the threshold T1, the notification control unit 18 further decides whether the forward gaze degree is higher than or equal to the threshold T2, which is higher than the threshold T1. As an example, the threshold T2 is set to a value according which it can be inferred to a certain extent that the probability is high that the driver's gaze is directed to the behavior of a preceding vehicle traveling ahead of the vehicle with the information notification apparatus 10 mounted. If the forward gaze degree is higher than or equal to the threshold T2, the forward gaze degree is classified as the high level. If the forward gaze degree is lower than the threshold T2, the forward gaze degree is classified as the middle level.

If the forward gaze degree is classified as the middle level, the driver is neither under pressure of checking the circumference nor under pressure of directing the driver's gaze to the behavior of the preceding vehicle, so it can be inferred that the workload is not high. In this case, the notification control unit 18 executes a first notification concerning an incoming message, which is, for example, a normal notification executed by the mobile terminal apparatus 20. For example, the notification control unit 18 displays an incoming message on the display 13 and also outputs a ring tone for the incoming message from the speaker 12.

If the forward gaze degree is classified as the high level, the driver is under pressure of directing the driver's gaze to the behavior of the preceding vehicle, so it can be inferred that the workload is high. In this case, although the display of the incoming message can be put on hold as in the case in which the forward gaze degree is classified as the low level, a second notification is executed as an example; in the second notification, the quality or quantity of display output or voice output is lower than in the first notification described above. For example, although, in the first notification, a ring tone is also output from the speaker 12, the notification control unit 18 does not practice the first notification but executes the second notification, in which the notification control unit 18 displays the incoming message on the display 13. Thus, a notification of an incoming message is moderately practiced.

As described above, the notification control unit 18 can implement notification control at many levels, at which the notification control unit 18 makes a notification of an incoming message normally or moderately depending on whether the forward gaze degree is classified as the middle or high level. Therefore, it can be suppressed that when the driver visually recognizes the forward, the workload is decided to be low in a uniform manner as in the other measurement method used by the calling timing control apparatus described above. As a result, as an aspect, the occurrence of distraction can be suppressed when the driver visually recognizes the forward. In addition, the notification control unit 18 selects a notification form by classifying the level of the forward gaze degree determined from the result of line-of-sight detection, so notification control can be implemented without listing high workload scenes, unlike the apparatuses described in BACKGROUND above. The notification form is a type of information. In notification control implemented by the notification control unit 18, therefore, applicable scenes are not so limited when compared with the apparatuses described in BACKGROUND above, so it is also possible to enhance versatility.

If the visual recognition deciding unit 17 decides that the incoming message display area has not been visually recognized within the predetermined time of the execution of the second notification, the notification control unit 18 switches the notification form for incoming messages from the second notification to the first notification. This enables an incoming message to be reliably checked.

The accepting unit 14, line-of-sight detecting unit 15, gaze degree calculating unit 16, visual recognition deciding unit 17, notification control unit 18, and other processing units described above can be implemented as described below. For example, these processing units can be implemented by causing a central processing unit (CPU) or the like to load processes having the same functions as the above processing units into a memory and execute the processes. These processing units may not be executed by the CPU in some cases; they may be executed by a microprocessor (MPU). In addition, the above processing units can also be executed by a hard wired logic.

As an example of a main storage unit used by the processing units above as a work area, a dynamic random-access memory (DRAM), a static random-access memory (SRAM), or a flash memory can be used. A storage unit referenced by the processing units above may not be a main storage unit in some cases; the storage unit may be an auxiliary storage unit. In this case, a hard disk drive (HDD), an optical disk drive, a solid state drive (SSD), or the like can be used.

Flow of Processing

Next, a flow of processing executed by the information notification apparatus 10 in this embodiment will be described. Forward gaze degree calculation processing in (1), executed by the information notification apparatus 10, will be described first, after which notification control processing will be described in (2).

(1) Forward Gaze Degree Calculation Processing

Figure 2:
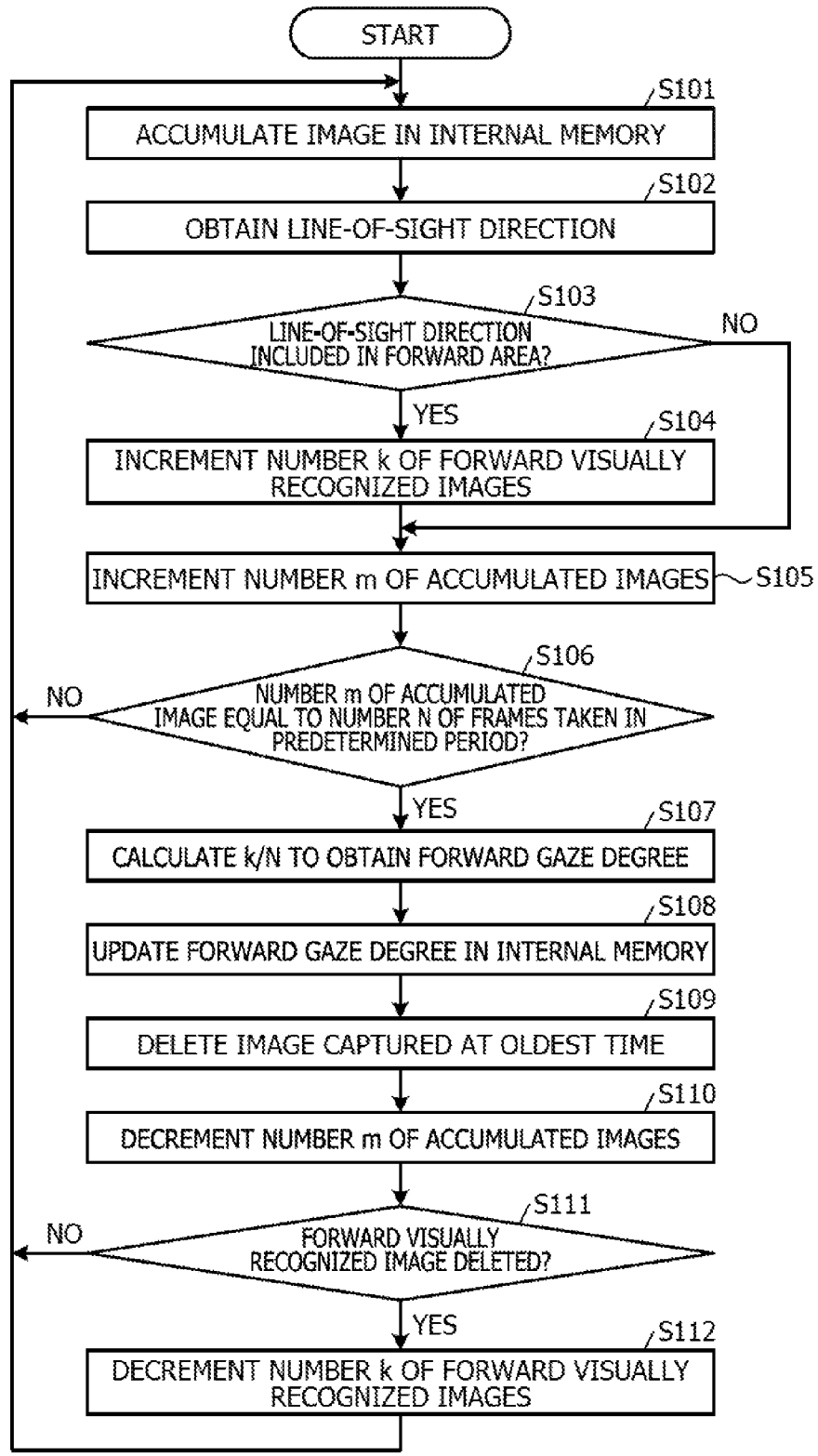
FIG. 2 is a flowchart illustrating a procedure for forward gaze degree calculation processing in the first embodiment.

FIG. 2 is a flowchart illustrating a procedure for forward gaze degree calculation processing in the first embodiment. As an example, this processing is repeated as long as an image is acquired from the camera 11. As illustrated in FIG. 2, an image acquired from the camera 11 is accumulated in an internal memory (step S101), and the line-of-sight detecting unit 15 obtains a line-of-sight direction from the image accumulated in the internal memory in step S101 (step S102).

If the line-of-sight direction obtained in step S102 is included in the forward area defined ahead of the field of view of the driver (the result in step S103 is Yes), the image used in step S102 to obtain a line-of-sight direction is classified as a forward visually recognized image. In this case, the gaze degree calculating unit 16 increments the value of a counter k, which counts the number of frames of forward visually recognized images, by one (step S104), and also increments the value of a counter m, which counts the number of frames of images accumulated in the internal memory, by one (step S105).

If the line-of-sight direction obtained in step S102 is not included in the forward area defined ahead of the field of view of the driver (the result in step S103 is No), the image used in step S102 to obtain a line-of-sight direction is not classified as a forward visually recognized image. In this case, the gaze degree calculating unit 16 increments the value of the counter m, which counts the number of frames of images accumulated in the internal memory, by one (step S105), without incrementing the value of the counter k, which counts the number of frames of forward visually recognized images.

After that, the gaze degree calculating unit 16 decides whether the number of frames of images accumulated in the internal memory, that is, the value of the counter m, is the number N of frames taken in a predetermined period (step S106). If the number of frames of images accumulated in the internal memory is not the number N of frames taken in the predetermined period (the result in step S106 is No), it is found that the predetermined period has not elapsed after processing illustrated in FIG. 2 had been started. In this case, the gaze degree calculating unit 16 returns to processing in step S101.

If the number of frames of images accumulated in the internal memory is the number N of frames taken in the predetermined period (the result in step S106 is Yes), the gaze degree calculating unit 16 executes processing to calculate the ratio of the number k of the frames of images classified as forward visually recognized images to the number N of frames taken in the predetermined period, that is, divides k by N, to obtain a forward gaze degree (step S107).

Next, the gaze degree calculating unit 16 updates the internal memory by overwriting it with the forward gaze degree calculated in step S107 (step S108). The gaze degree calculating unit 16 then deletes the image captured at the oldest time from the images accumulated in the internal memory (step S109) and decrements the value of the counter m, which counts the number of frames of images accumulated in the internal memory, by one (step S110).

If the image deleted in step S109 is a forward visually recognized image (the result in step S111 is Yes), the gaze degree calculating unit 16 decrements the value of the counter k, which counts the number of frames of forward visual recognition images by one (step S112) and returns to processing in step S101. If the image deleted in step S109 is not a forward visually recognized image (the result in step S111 is No), the gaze degree calculating unit 16 returns to processing in step S101 without updating the value of the counter k.

(2) Notification Control Processing

Figure 3:
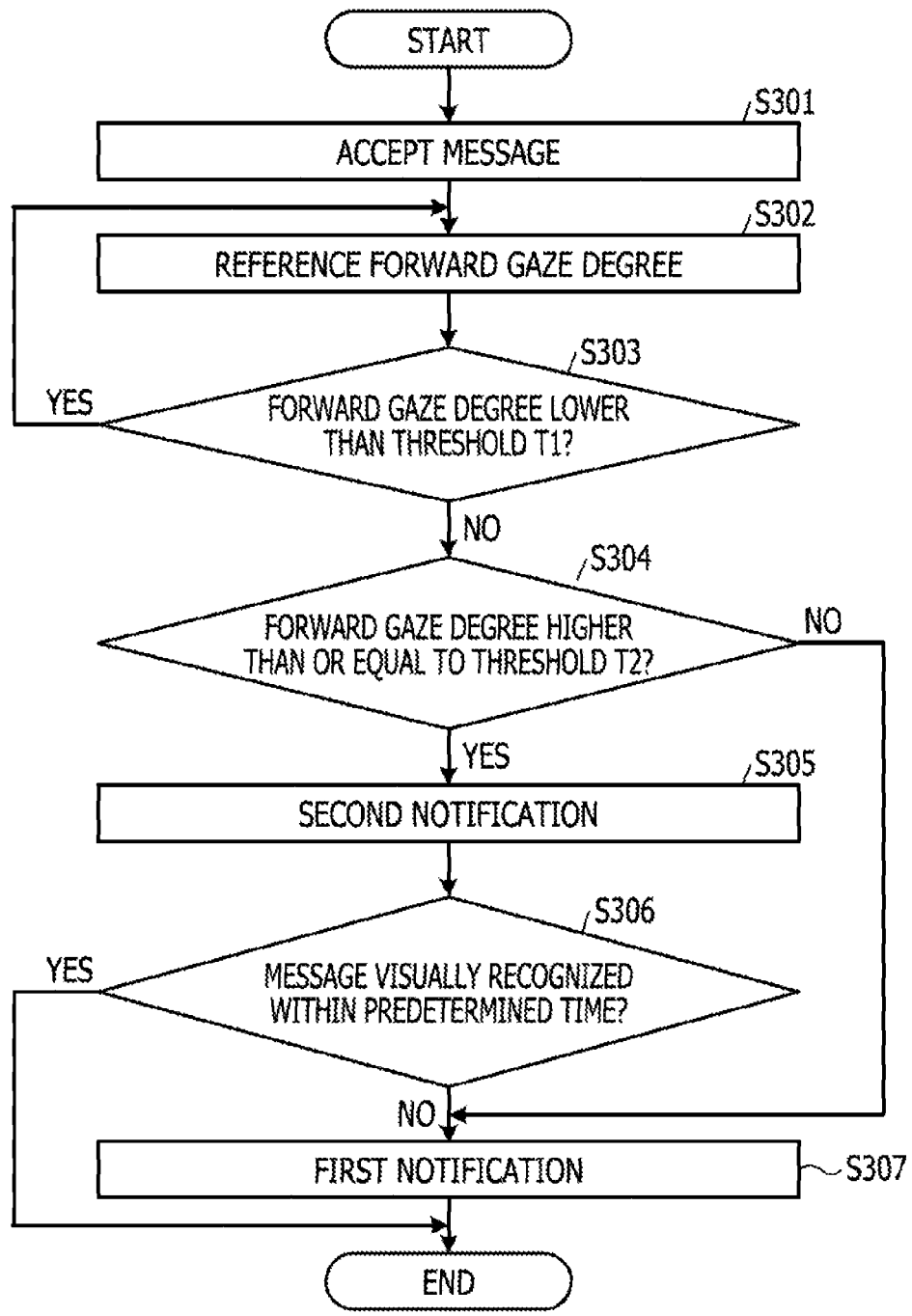
FIG. 3 is a flowchart illustrating a procedure for executing notification control processing in the first embodiment.

FIG. 3 is a flowchart illustrating a procedure for executing notification control processing in the first embodiment. This processing is executed when, as an example, an incoming message or another notification is received by the accepting unit 14.

As illustrated in FIG. 3, when an incoming message or another notification is accepted (step S301), the notification control unit 18 references the forward gaze degree stored in the internal memory by the gaze degree calculating unit 16 (step S302).

Next, the notification control unit 18 decides whether the forward gaze degree referenced in step S302 is lower than the threshold T1 (step S303). If the forward gaze degree is lower than the threshold T1 (the result in step S303 is Yes), the forward gaze degree is classified as the low level. If the forward gaze degree is classified as the low level in this way, the driver is under pressure of checking the circumference, so it can be inferred that the workload is high. In this case, even if an incoming message has been accepted in step S301, the notification control unit 18 puts the incoming message on hold without immediately displaying the incoming message on the display 13. Instead, the notification control unit 18 returns to step processing in S302 and references again the forward gaze degree updated in step S108 in FIG. 2.

If the forward gaze degree is higher than or equal to the threshold T1 (the result in step S303 is No), the notification control unit 18 further decides whether the forward gaze degree is higher than or equal to the threshold T2, which is higher than the threshold T1 (step S304). If the forward gaze degree is higher than or equal to the threshold T2 (the result in step S304 is Yes), the forward gaze degree is classified as the high level. If the forward gaze degree is lower than the threshold T2 (the result in step S304 is No), the forward gaze degree is classified as the middle level.

If the forward gaze degree is classified as the high level (the result in step S304 is Yes), the driver is under pressure of directing the driver's gaze to the behavior of the preceding vehicle, so it can be inferred that the workload is high. In this case, the notification control unit 18 executes the second notification, in which the notification control unit 18 suppresses a ring tone for the incoming message from being output from the speaker 12 and just displays the incoming message on the display 13. Thus, a notification of the incoming message is moderately practiced (step S305).

If the incoming message display area has not been visually recognized within a predetermined time after that (the result in step S306 is No), the notification control unit 18 outputs a ring tone for the incoming message from the speaker 12 and displays the incoming message on the display 13, by which the notification form for incoming messages is switched from the second notification to the first notification by (step S307). If the incoming message display area has been visually recognized within the predetermined time (the result in step S306 is Yes), the notification control unit 18 terminates the processing without switching the notification form for incoming messages from the second notification to the first notification.

If the forward gaze degree is classified as the middle level (the result in step S304 is No), the driver is neither under pressure of checking the circumference nor under pressure of directing the driver's gaze to the behavior of the preceding vehicle, so it can be inferred that the workload is not high. In this case, the notification control unit 18 executes the first notification, in which the notification control unit 18 displays the incoming message on the display 13 and also outputs a ring tone for the incoming message from the speaker 12 (step S307) and terminates the processing.

One Aspect of Effects

As described above, the information notification apparatus 10 implements notification control so that if the forward gaze degree, which is calculated with reference to a line-of-sight direction obtained in line-of-sight detection performed on an image on which the driver is photographed, is higher than or equal to a threshold, a notification of an incoming message or the like to the user is moderately executed. Therefore, the information notification apparatus 10 in this embodiment can suppress the occurrence of distraction.

Second Embodiment

Figure 4:
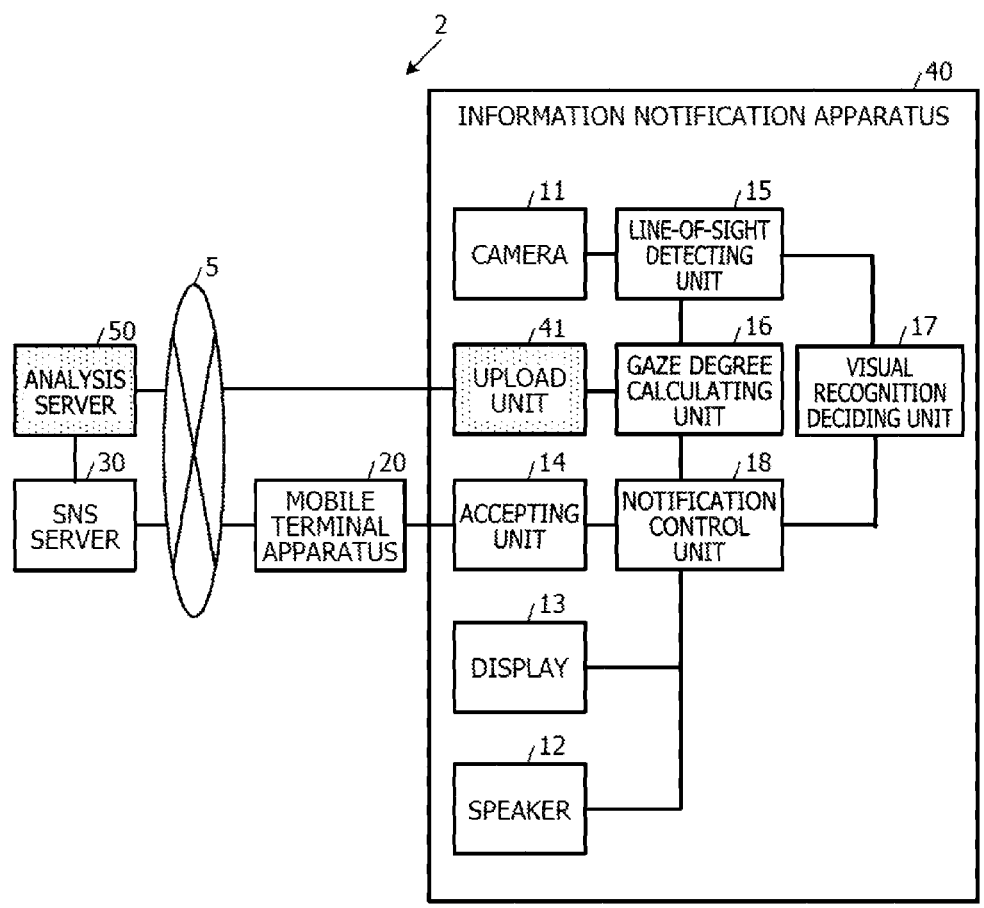
FIG. 4 is a block diagram illustrating an example of the structure of a data analysis system including an information notification apparatus and an analysis server in a second embodiment.

In this embodiment, a case in which a data analysis service for forward gaze degrees is further provided will be described. FIG. 4 is a block diagram illustrating an example of the structure of a data analysis system 2 including an information notification apparatus 40 and an analysis server 50 in the second embodiment. As illustrated in FIG. 4, the analysis system 2 differs from the example in FIG. 1 in that the analysis system 2 further has the analysis server 50 connected to the information notification apparatus 40 through the network 5 and that the information notification apparatus 40 further has an upload unit 41. In FIG. 4, the functional units having the same functions as the functional units in FIG. 1 are assigned the same reference numerals and repeated descriptions will be omitted.

The upload unit 41 is a processing unit that uploads data from the information notification apparatus 40 to the analysis server 50.

As an embodiment, the upload unit 41 uploads a forward gaze degree calculated by the gaze degree calculating unit 16 to the analysis server 50. Each time the gaze degree calculating unit 16 calculates a forward gaze degree, the upload unit 41 can upload it. Alternatively, the upload unit 41 can upload forward gaze degrees accumulated, starting from the previous upload and continuing until a predetermined time of the day is reached. Alternatively, the upload unit 41 can update forward gaze degrees accumulated, starting from the previous upload and continuing until a predetermined period, such as, for example, one minute, elapses from the previous upload.

The description below assumes a case in which each time the gaze degree calculating unit 16 calculates a forward gaze degree, it is uploaded, but it will be understood that this is merely an example.

The analysis server 50 is a server apparatus that provides the above data analysis service to the information notification apparatus 40.

As an embodiment, the analysis server 50 is implemented by installing an analysis program that provides the data analysis service described above in a desired computer as package software or online software. For example, the analysis server 50 may be implemented as a web server that provides the data analysis service described above. Alternatively, the analysis server 50 may be implemented as a cloud that provides the data analysis service described above in the form of outsourcing.

Figure 5:
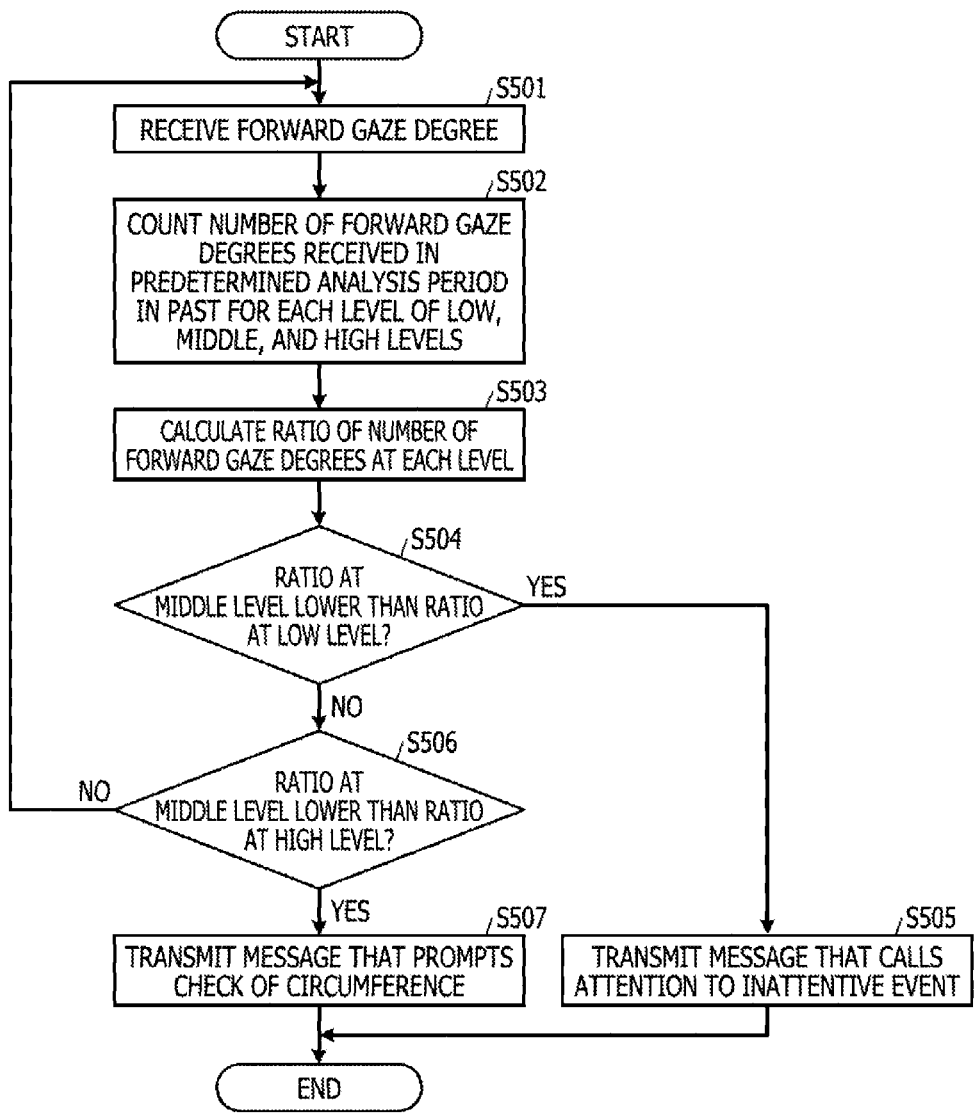
FIG. 5 is a flowchart illustrating a procedure for data analysis processing in the second embodiment.

FIG. 5 is a flowchart illustrating a procedure for data analysis processing in the second embodiment. This processing is executed when, as an example, a forward gaze degree is uploaded from the information notification apparatus 40. As illustrated in FIG. 5, when the analysis server 50 receives a forward gaze degree uploaded from the upload unit 41 (step S501), the analysis server 50 counts the number of forward gaze degrees received in a predetermined analysis period, which goes back from a time when step S501 was executed, the predetermined analysis period being, for example, one minute, for each of three levels, which are low, middle, and high levels, of the values of the forward gaze degrees (step S502).

Next, the analysis server 50 calculates the ratio of the number of forward gaze degrees at each of the three levels, which are the low, middle, and high levels, to the total number of forward gaze degrees received at the level in the analysis period (step S503).

The analysis server 50 then decides whether the ratio of the number of forward gaze degrees at the middle level is lower than the ratio of the number of forward gaze degrees at the low level (step S504). If the ratio of the number of forward gaze degrees at the middle level is lower than the ratio of the number of forward gaze degrees at the low level (the result in step S504 is Yes), a decision can be made as described below. If normal driving is in progress, the probability is high that the ratio of the number of forward gaze degrees at the middle level is higher than the ratio of the number of forward gaze degrees at the low level. Therefore, if the ratio of the number of forward gaze degrees at the middle level is lower than the ratio of the number of forward gaze degrees at the low level, it can be inferred that the driver tends to drive inattentively.

In this case, the analysis server 50 controls the SNS server 30 so that it transmits, to the information notification apparatus 40, a message that calls the driver's attention to inattentive driving (step S505), and terminates the processing.

If the ratio of the number of forward gaze degrees at the middle level is not lower than the ratio of the number of forward gaze degrees at the low level (the result in step S504 is No), the analysis server 50 decides whether the ratio of the number of forward gaze degrees at the middle level is lower than the ratio of the number of forward gaze degrees at the high level (step S506).

If the ratio of the number of forward gaze degrees at the middle level is lower than the ratio of the number of forward gaze degrees at the high level (the result in step S506 is Yes), a decision can be made as described below. If normal driving is in progress, the probability is high that the ratio of the number of forward gaze degrees at the middle level is higher than the ratio of the number of forward gaze degrees at the high level. Therefore, if the ratio of the number of forward gaze degrees at the middle level is lower than the ratio of the number of forward gaze degrees at the high level, it can be inferred that the driver tends to pay too much attention to the forward without checking the circumference.

In this case, the analysis server 50 controls the SNS server 30 so that it transmits, to the information notification apparatus 40, a message that prompts the driver to check the circumference (step S507), and terminate the processing.

If the ratio of the number of forward gaze degrees at the middle level is not lower than the ratio of the number of forward gaze degrees at the low level (the result in step S504 is No) and the ratio of the number of forward gaze degrees at the middle level is not lower than the ratio of the number of forward gaze degrees at the high level (the result in step S506 is No), this indicates that the ratio of the number of forward gaze degrees at the middle level is the maximum. In this case, the probability is high that the driver is driving properly, so the analysis server 50 returns to processing in step S501 and repeats processing in the subsequent steps, without executing a notification of a message that calls the driver's attention to inattentive driving or prompting the driver to check the circumference.

One Aspect of Effects

As described above, if the ratio of the number of forward gaze degrees at the middle level is lower than the ratio of the number of forward gaze degrees at the low level, the analysis server 50 notifies the information notification apparatus 40 of an analysis result that calls the driver's attention to inattentive driving. If the ratio of the number of forward gaze degrees at the middle level is lower than the ratio of the number of forward gaze degrees at the high level, the analysis server 50 notifies the information notification apparatus 40 of an analysis result that prompts the driver to check the circumference. Therefore, the analysis server 50 in this embodiment can support the driving of the driver.

Third Embodiment

Although embodiments of the disclosed apparatus have been described so far, the present disclosure may be practiced in various other forms besides the embodiments described above. Another embodiment included in the present disclosure will be described below.

Upload Information

In the second embodiment described above, a case has been taken as an example in which forward gaze degrees are uploaded from the information notification apparatus 40 to the analysis server 50. However, this does not restrict types of information to be uploaded. For example, an information notification apparatus can upload data output from another vehicle-mounted apparatus such as, for example, a navigation apparatus or an ECU, besides forward gaze degrees.

Figure 6:
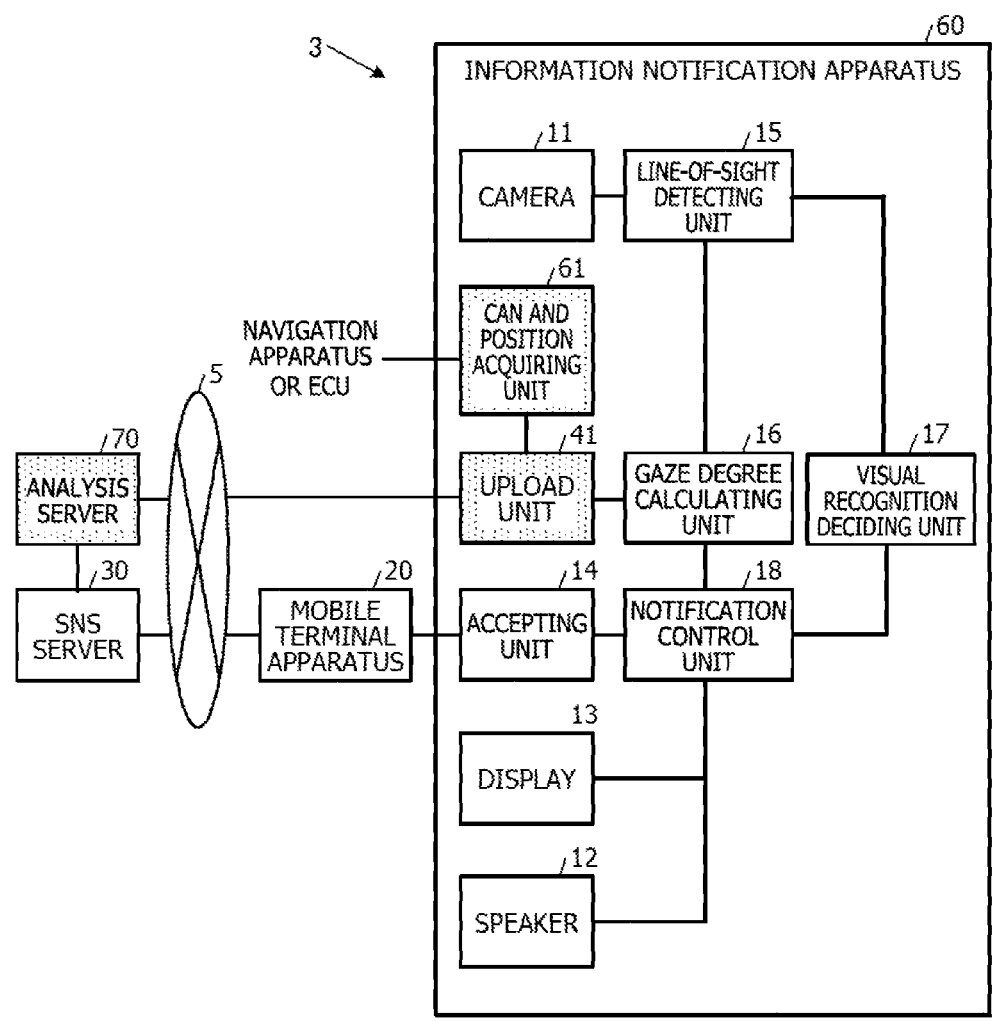
FIG. 6 is a block diagram illustrating an example of the structure of a data analysis system including an information notification apparatus and an analysis server in a third embodiment.

FIG. 6 is a block diagram illustrating an example of the structure of a data analysis system 3 including an information notification apparatus 60 and an analysis server 70 in the third embodiment. As illustrated in FIG. 6, the data analysis system 3 differs from the analysis system 2 in FIG. 4 in that the information notification apparatus 60 further has a controller area network (CAN) and position acquiring unit 61 and that contents to be analyzed by the analysis server 70 differ. In FIG. 6, the functional units having the same functions as the functional units in FIG. 4 are assigned the same reference numerals and repeated descriptions will be omitted.

The CAN and position acquiring unit 61 is a processing unit that acquires CAN data and positional data.

As an embodiment, the CAN and position acquiring unit 61 can acquire vehicle data such as vehicle speed from an ECU connected to the CAN and position acquiring unit 61 through a CAN or another vehicle-mounted network. In addition, the CAN and position acquiring unit 61 can acquire positional data measured by a global positioning system (GPS) receiver mounted in a navigation apparatus or the like.

The analysis server 70 can perform analysis as described below by using vehicle data and positional data uploaded from the CAN and position acquiring unit 61 through the upload unit 41.

Although FIG. 6 illustrates, as an example, a case in which only one information notification apparatus 60 is accommodated in the analysis server 70, this is not a limitation; the analysis server 70 can accommodate many information notification apparatuses 60 in practice. When many information notification apparatuses 60 are accommodated in the analysis server 70, the analysis server 70 can also acquire data including the vehicle data and positional data described above from the many information notification apparatuses 60. As an example, a case will be assumed here in which time-series data of vehicle speed, which is, for example, data associated with time and vehicle speed, is acquired as vehicle data, and time-series data of positions, which is, for example, data associated with time and positions (coordinates in a predetermined coordinate system such as, for example, latitudes and longitudes) is acquired as positional data.

In a situation in which the vehicle data and positional data described above have been acquired, the analysis server 70 can locate a position at which inattentive driving frequently occurs during driving. Specifically, if the vehicle speed included in the vehicle data is higher than or equal to a predetermined value, the analysis server 70 decides that the vehicle is traveling and identifies a period during which the vehicle is traveling. For each forward gaze degree that had been calculated in the period during which the vehicle was traveling and has been uploaded from the information notification apparatus 60, the analysis server 70 assigns an inattentive driving label to a time of the day that is classified into the low forward gaze degree level. The analysis server 70 then identifies, as an inattentive event occurrence position, a position, included in the positional data, that corresponds to a time of the day to which an inattentive driving label is assigned. When the analysis server 70 accumulates inattentive event occurrence positions identified earlier, the analysis server 70 can provide services as described below. For example, when the analysis server 70 maps, on a road map, an inattentive event occurrence position located from information uploaded from the information notification apparatus 60, the driver can grasp an inattentive driving situation on a road on the road map. In addition, when the analysis server 70 maps, on a road map, a node and a link at which a predetermined number of inattentive events or more have occurred as a black spot of inattentive events, the driver can also grasp the black spot of inattentive events on the road map.

Although FIG. 6 illustrates a case in which vehicle data and positional data are uploaded from the information notification apparatus 60 to the analysis server 70, it is also possible to upload a decision result made by the visual recognition deciding unit 17. For example, the information notification apparatus 60 decides whether an advertisement message transmitted from the SNS server 30 to the information notification apparatus 60 has been visually recognized by the driver. Thus, it is possible to analyze the driver's interest and concern for the advertisement.

Method of Setting Thresholds

As illustrated in FIG. 6, when not only forward gaze degrees but also vehicle data and positional data are collected in the analysis server 70, the analysis server 70 can also set the thresholds T1 and T2, which are used by the notification control unit 18 in the information notification apparatuses 10, 40, and 60 in the first to third embodiments to classify the forward gaze degrees, by using the forward gaze degrees, vehicle data, and positional data. In the description below, a case will be assumed in which, as an example of vehicle data, time-series data of inter-vehicle distances, which is, for example, data with which time and inter-vehicle distances are associated, is uploaded.

For example, the analysis server 70 creates a histogram of forward gaze degrees for each data sample of scenes corresponding to the high, middle, or low level. Specifically, from positional data samples, the analysis server 70 determines a sample including a position corresponding to a traffic intersection in a node, the position of which is not illustrated, the node being included in road network data. The analysis server 70 then uses, as a search key, the time of the day included in the positional data sample determined before, and extracts, from the samples of forward gaze degrees uploaded from the information notification apparatus 60, samples of the forward gaze degree calculated at the time of the day, which is used as the search key. After that, the analysis server 70 creates a forward gaze degree histogram concerning the traffic intersection from the forward gaze degrees samples extracted before.

Furthermore, the analysis server 70 determines, from vehicle data samples, samples in which the inter-vehicle distance is within a predetermined value. The analysis server 70 then uses, as a search key, the time of the day included in the vehicle data sample determined before, and extracts, from the samples of forward gaze degrees uploaded from the information notification apparatus 60, samples of the forward gaze degree calculated at the time of the day, which is used as the search key. After that, the analysis server 70 creates a forward gaze degree histogram concerning the presence of a preceding vehicle from the forward gaze degrees samples extracted before.

The analysis server 70 also extracts, from the samples of forward gaze degrees uploaded from the information notification apparatus 60, samples that have not been used in the creation of either of a forward gaze degree histogram concerning a traffic intersection and a forward gaze degree histogram concerning the presence of a preceding vehicle. The analysis server 70 then creates a forward gaze degree histogram concerning a non-traffic-intersection location and the absence of a preceding vehicle from the forward gaze degrees samples extracted before.

Figure 7:
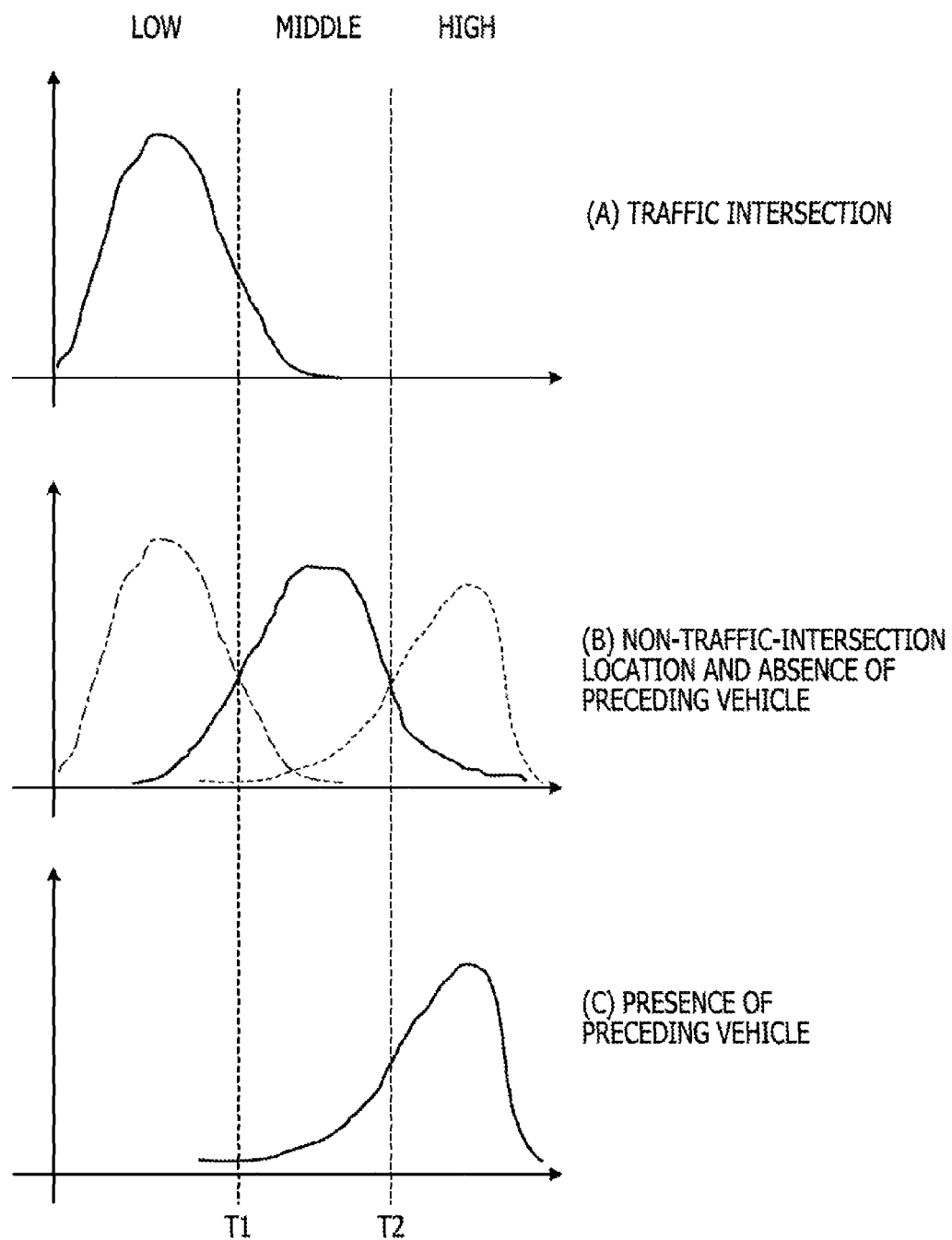
FIG. 7 illustrates examples of histograms of forward gaze degrees.

By using these three forward gaze degree histograms, the analysis server 70 can calculate the thresholds T1 and T2, according to which forward gaze degrees are classified into three levels, which are the high level, middle level, and low level. FIG. 7 illustrates examples of histograms of forward gaze degrees. At the top in FIG. 7, a forward gaze degree histogram (A) concerning a traffic intersection is illustrated. At the middle in FIG. 7, a forward gaze degree histogram (B) concerning a non-traffic-intersection location and the absence of a preceding vehicle is illustrated. At the bottom in FIG. 7, a forward gaze degree histogram (C) concerning the presence of a preceding vehicle is illustrated.

As illustrated in FIG. 7, the forward gaze degree histogram (A) concerning a traffic intersection represents a typical high-load state in which checking a circumference is desirable, because the location is a traffic intersection. The forward gaze degree histogram (C) concerning the presence of a preceding vehicle represents a typical high-load state in which a forward gaze is desirable because a preceding vehicle is present. The forward gaze degree histogram (B)

concerning a non-traffic-intersection location and the absence of a preceding vehicle represents a frequency distribution in an average state, in which the load is not high, because the scene is other than the above scenes and forward gaze degrees are accumulated. Therefore, frequency distributions in (A), (B), and (C) have different mode values. That is, if these frequency distributions are superposed, three peaks appear.

As a method of determining the two thresholds, T1 and T2, described above, therefore, the analysis server 70 can set values at two troughs formed by the three peaks as the thresholds T1 and T2. At the middle in FIG. 7, for example, the forward gaze degree histogram (B) concerning a non-traffic-intersection location and the absence of a preceding vehicle is illustrated with a solid line, the forward gaze degree histogram (A) concerning a traffic intersection is illustrated with a dash-dot line, and the forward gaze degree histogram (C) concerning the presence of a preceding vehicle is illustrated with a dashed line. Of these three histograms, the analysis server 70 sets the intersection between the forward gaze degree histogram (A) concerning a traffic intersection and the forward gaze degree histogram (B) concerning a non-traffic-intersection location and the absence of a preceding vehicle as the threshold T1. The analysis server 70 also sets the intersection between the histogram (B) concerning a non-traffic-intersection location and the absence of a preceding vehicle and the forward gaze degree histogram (C) concerning the presence of a preceding vehicle as the threshold T2. The thresholds T1 and T2 set in this way are transmitted to the information notification apparatus 60, from which forward gaze degrees have been transmitted, after which the thresholds T1 and T2 are set in the work area in the internal memory, the work area being referenced by the notification control unit 18 to see classified forward gaze degrees.

As described above, when the above three histograms are used to set the thresholds T1 and T2, according to which forward gaze degrees are classified, the thresholds T1 and T2 can be set to match the personal property. As a result, a more precise decision can be made as to an inattentive event, an excessive circumference check, and other events involved in fatigue, strain, or the like.

Notification Forms

In the first and second embodiments described above, to differentiate between the first notification and second notification, the first notification has been executed by displaying an incoming message and producing a sound effect and the second notification has been executed by displaying an incoming message, as an example. However, another method can be used to differentiate between the first notification and second notification. For example, when a detailed display is given in the first notification and a simplified display is given in the second notification, it is possible to differentiate between the first notification and second notification. In this case, in the first notification, all of the contents of an incoming message, such as a title and text, for example, can be displayed, and in the second notification, only a title or only part of text, for example, can be displayed or only a mark indicating the presence of an unread message, for example, can be displayed.

Contents of a Notification

In the first and second embodiments described above, notifications of incoming messages have been described. However, the contents of a notification are not limited to a message. Notification control described above can also be applied to outputs of displays other than messages. For example, notification control described above can also be applied to notifications by using a mark. In this case, the second notification can be achieved by using a mark having a smaller size than in the first notification or a mark having a lower color saturation than in the first notification. Furthermore, notification forms are not limited to display outputs; notification control described above can also be applied to notifications by voice outputs. For example, the second notification can be achieved by reducing the volume of a notification to a level lower than in the first notification, by slowing the tempo to a level lower than in the first notification, or by reducing the frequency of a notification tone to a level lower than in the first notification.

Standalone

In the second and third embodiments described above, as an example, the analysis servers 50 and 70 have respectively provided the data analysis service described above to the information notification apparatuses 40 and 60. However, the data analysis service may not be provided in a client-server system in some cases. That is, the information notification apparatuses 40 and 60 can also execute the data analysis service described respectively in the second and third embodiments on a standalone basis.

Separation and Integration

The physical layouts of the constituent elements in individual apparatuses illustrated in the drawings may not be limited as illustrated in the drawings. That is, specific forms of the separation and integration of the constituent elements in the individual units are not limited as illustrated in the drawings; all or part of these constituent elements may be functionally or physically separated or integrated in a desired unit, depending on various loads, the usage status, and the like. For example, the accepting unit 14, line-of-sight detecting unit 15, gaze degree calculating unit 16, visual recognition deciding unit 17, or notification control unit 18 may be a unit outside the information notification apparatus 10, 40, or 60 and may be connected to the information notification apparatus 10, 40, or 60 through a network. Alternatively, the accepting unit 14, line-of-sight detecting unit 15, gaze degree calculating unit 16, visual recognition deciding unit 17, or notification control unit 18 may be included in another apparatus and may be connected to the information notification apparatus 10, 40, or 60 through a network and may cooperate to implement to functions of the information notification apparatus 10, 40, or 60.

Information Notification Program

Various processing described in the above embodiments can be implemented by executing a program prepared in advance in a personal computer, a workstation, or another type of computer. An example of a computer that executes an information notification program having functions similar to the functions in the above embodiments will be described below with reference to FIG. 8.

Figure 8:
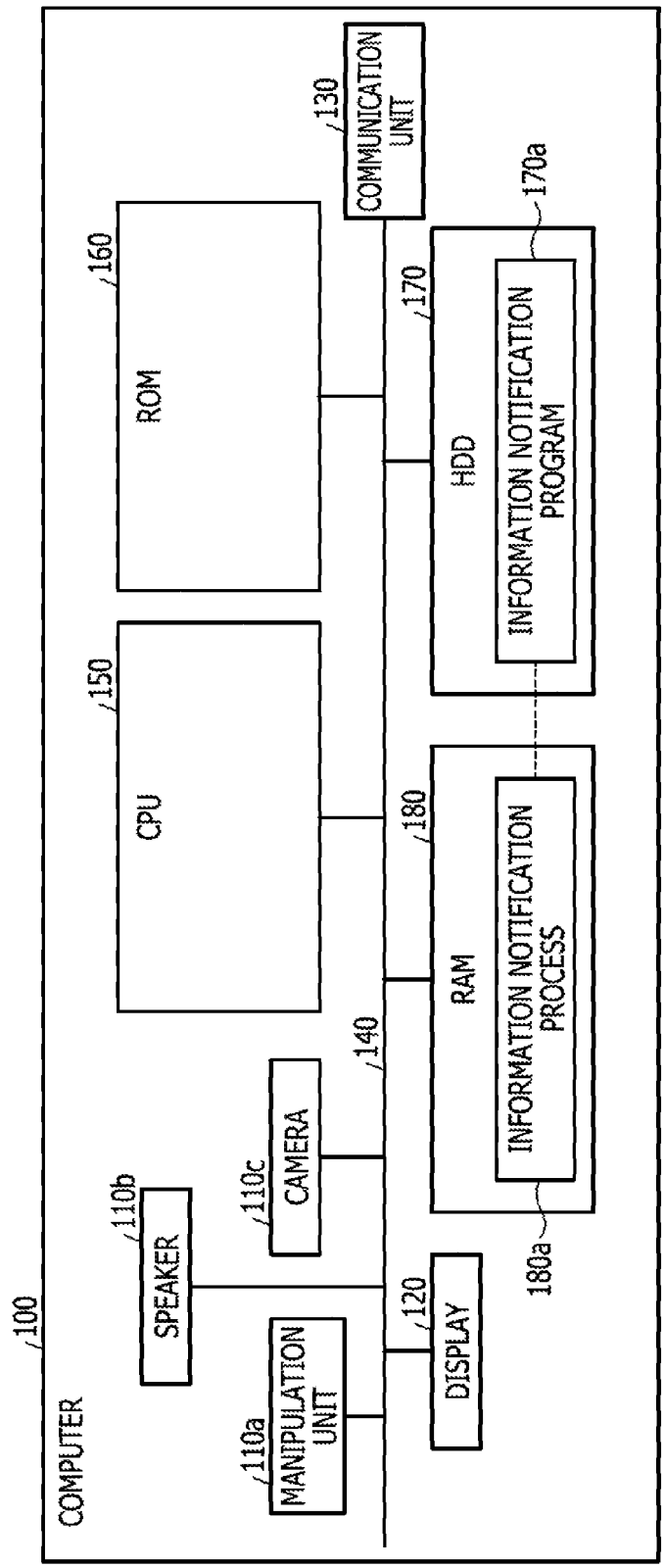
FIG. 8 illustrates an example of the hardware structure of a computer that executes an information notification program in the first to third embodiments.

FIG. 8 illustrates an example of the hardware structure of a computer 100 that executes an information notification program in the first to third embodiments. As illustrated in FIG. 8, the computer 100 has a manipulation unit 110a, a speaker 110b, a camera 110c, a display 120, and a communication unit 130. The computer 100 also has a CPU 150, a read-only memory (ROM) 160, an HDD 170, and a RAM 180. These components denoted 110 to 180 are interconnected through a bus 140.

An information notification program 170a is stored in the HDD 170 as illustrated in FIG. 8. The information notification program 170a provides functions similar to the functions of the accepting unit 14, line-of-sight detecting unit 15, gaze degree calculating unit 16, visual recognition deciding unit 17, and notification control unit 18 described in the first to third embodiment above. The information notification program 170a may be an integrated program or a collection of individual programs as with the accepting unit 14, line-of-sight detecting unit 15, gaze degree calculating unit 16, visual recognition deciding unit 17, and notification control unit 18 illustrated in FIGS. 1, 4, and 6. That is, all data indicated in the first to third embodiment above may not be stored in the HDD 170, but it suffices that only data used in processing is stored in the HDD 170.

In this environment, the CPU 150 reads out the information notification program 170a from the HDD 170 and loads the information notification program 170a into the RAM 180. As a result, the information notification program 170a functions as an information notification process 180a as illustrated in FIG. 8. The information notification process 180a reads out various data from the HDD 170 and loads the read-out data into an area, assigned to the information notification process 180a, in a storage area in the RAM 180, after which the information notification process 180a uses the loaded data to execute various processing. For example, examples of processing executed by the information notification process 180a include processing illustrated in FIGS. 2, 3, and 5 and other processing. In the CPU 150, all processing units described in the first embodiment above may not operate in some cases; it suffices that only processing units corresponding to processing to be executed are virtually implemented.

The information notification program 170a may not have been stored in the HDD 170 or ROM 160 from scratch in some cases. For example, the information notification program 170a may be stored on a flexible disc, inserted into the computer 100, which is a so-called floppy disc (FD), a compact disc-read-only memory (CD-ROM), a digital versatile disc (DVD), a magneto-optical disc, an integrated circuit (IC) card, or another portable physical medium. Then, the computer 100 may acquire the information notification program 170a from the portable physical medium and may execute the information notification program 170a. Alternatively, the information notification program 170a may be stored in another computer or a server apparatus connected to the computer 100 through a public line, the Internet, a LAN, or a wide area network (WAN) and the computer 100 may acquire the information notification program 170a from the other computer or server apparatus and may execute the information notification program 170a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information notification apparatus comprising:
a camera configured to capture an image of a driver of a vehicle;
a memory; and
a processor coupled to the memory and configured to:
perform line-of-sight detection based on the image captured by the camera;
calculate a forward gaze degree of a gaze of the driver in accordance with a line-of-sight direction obtained in the line-of-sight detection, the forward gaze degree indicates whether the gaze of the driver is within a predetermined area of a direction in which the vehicle is traveling;
provide a notification to the driver in a first information when the forward gaze degree is lower than a first threshold; and
provide the notification to the driver in a second information when the forward gaze degree is higher than or equal to the first threshold, the second information includes less than the first information,
wherein the processor further executes the notification in the second information when the forward gaze degree is lower than a second threshold which is lower than the first threshold,
wherein the processor further classifies the forward gaze degree as a first group when a position at a time when the forward gaze degree was calculated is a traffic intersection, as a second group when an inter-vehicle distance at a time when the forward gaze degree was calculated is smaller than a predetermined value, and as a third group when the forward gaze degree is not classified as either the first group or the second group, after which the processor creates a forward gaze degree histogram for each of the first group, the second group, and the third group and sets the first threshold and the second threshold according to three forward gaze degree histograms related to the first group, the second group, and the third group.

2. The information notification apparatus according to claim 1, further comprising a display,
wherein the notification is a display output directed to the display.

3. The information notification apparatus according to claim 2, wherein:
according to a result in the line-of-sight detection, the processor further decides whether the notification that had been output as the display output in the second information has been visually recognized; and
when the notification that had been output as the display output in the second information has not been visually recognized within a predetermined time, the processor switches the display output of the notification from the second information to the first information.

4. The information notification apparatus according to claim 1, wherein when a number of times at which the forward gaze degree higher than or equal to the first threshold is calculated is higher than or equal to a predetermined value, the processor further executes a circumference check notification that prompts the driver to check of a circumference of the vehicle.

5. The information notification apparatus according to claim 1, wherein when a number of times which the forward gaze degree lower than the second threshold is calculated is higher than or equal to a predetermined value, the processor further executes a warning notification that warns the driver of being inattentive.

6. The information notification apparatus according to claim 1, wherein the processor further sets a class value of the forward gaze degree to the second threshold, the class value being obtained at an intersection between a distribution curve of the forward gaze degree histogram related to the first group and a distribution curve of the forward gaze degree histogram related to the third group, and also sets a class value of the forward gaze degree to the first threshold, the class value being obtained at an intersection between a distribution curve of the forward gaze degree histogram related to the second group and a distribution curve of the forward gaze degree histogram related to the third group.

7. The information notification apparatus according to claim 1, wherein the processor is further configured to:
classify images obtained by the camera based on the calculated forward gaze degree for each image, each image being classified as a forward visually recognized image or not a forward visually recognized image;
determine a ratio of a number of the classified forward visually recognized images to a number of images obtained by the camera within a predetermined period; and
provide one of the notification that prompts the driver to check of a circumference of the vehicle based on the determined ratio.

8. An information notification method comprising:
capturing, with a camera, an image of a driver of a vehicle;
performing, with a processor, line-of-sight detection based on the image captured by the camera,
calculating, with the processor, a forward gaze degree of a gaze of the driver in accordance with a line-of-sight direction obtained in line-of-sight detection, the forward gaze degree indicates whether the gaze of the driver is within a predetermined area of a direction in which the vehicle is travelling;
providing a notification to the driver in a first information when the forward gaze degree is lower than a first threshold; and
providing the notification in a second information when the forward gaze degree is higher than or equal to the first threshold, the second information includes less information than the first information,
wherein the processor further executes the notification in the second information when the forward gaze degree is lower than a second threshold which is lower than the first threshold,
wherein the processor further classifies the forward gaze degree as a first group when a position at a time when the forward gaze degree was calculated is a traffic intersection, as a second group when an inter-vehicle distance at a time when the forward gaze degree was calculated is smaller than a predetermined value, and as a third group when the forward gaze degree is not classified as either the first group or the second group, after which the processor creates a forward gaze degree histogram for each of the first group, the second group, and the third group and sets the first threshold and the second threshold according to three forward gaze degree histograms related to the first group, the second group, and the third group.

9. A vehicle-mounted apparatus to provide notifications to a driver, the vehicle-mounted apparatus comprising:
a notification device configured to present notifications to the driver of a vehicle in a plurality of forms based on a workload of the driver;
a memory;
a processor coupled to the memory and the at least one notification device, the processor configured to:
acquire a travelling direction of the vehicle;
perform line-of-sight detection to determine a line-of-sight for the driver;
calculate a gaze degree associated with the driver, the gaze degree indicating frequency of the determined line-of-sight of the driver included within a predetermined range of the travelling direction of the vehicle;
classify the workload of the driver as low when the calculated forward gaze degree is lower than a threshold;
classify the workload of the driver as high when the calculated forward gaze degree is higher than the threshold;
provide a notification to the at least one notification device in a first information when the workload of the driver is classified as low; and
provide the notification to the at least one notification device in a second information when the workload of the driver is classified as high, the second information includes less information than the first information,
wherein the line-of-sight detection determines a line-of-sight vector for the driver that interconnects a central position of a pupil of the eyeball and a center of the curvature of the cornea, and the processor calculates the gaze degree by determining whether an angle formed by the line-of-sight vector and a vector of the traveling direction of the vehicle is within a predetermined range,
wherein the processor further classifies the forward gaze degree as a first group when a position at a time when the forward gaze degree was calculated is a traffic intersection, as a second group when an inter-vehicle distance at a time when the forward gaze degree was calculated is smaller than a predetermined value, and as a third group when the forward gaze degree is not classified as either the first group or the second group, after which the processor creates a forward gaze degree histogram for each of the first group, the second group, and the third group and sets the first threshold and the second threshold according to three forward gaze degree histograms related to the first group, the second group, and the third group.

* * * * *